US009878651B2

(12) United States Patent
Herman et al.

(10) Patent No.: US 9,878,651 B2
(45) Date of Patent: Jan. 30, 2018

(54) VERTICALLY ORIENTED TRANSPORTABLE CONTAINER WITH IMPROVED STABILITY

(71) Applicant: QUICKTHREE SOLUTIONS INC., Saskatoon (CA)

(72) Inventors: Alvin Herman, Saskatoon (CA); Erin Herman, Clavet (CA)

(73) Assignee: QUICKTHREE SOLUTIONS INC., Saskatoon (CA)

( * ) Notice: Subject to any disclaimer, the term of this patent is extended or adjusted under 35 U.S.C. 154(b) by 0 days.

(21) Appl. No.: 15/063,839

(22) Filed: Mar. 8, 2016

(65) Prior Publication Data

US 2016/0185522 A1 Jun. 30, 2016

Related U.S. Application Data

(63) Continuation of application No. 14/234,253, filed on Apr. 7, 2014, now Pat. No. 9,315,294.

(51) Int. Cl.
*B65D 88/28* (2006.01)
*B65D 88/54* (2006.01)
(Continued)

(52) U.S. Cl.
CPC .................... *B60P 1/04* (2013.01); *B60P 3/40* (2013.01); *B65D 88/30* (2013.01); *B65D 88/32* (2013.01);
(Continued)

(58) Field of Classification Search
CPC ........ G01G 13/06; G01G 13/16; G01G 13/18; G01F 11/261; G01F 11/263; B65D 88/26;
(Continued)

(56) References Cited

U.S. PATENT DOCUMENTS 2,259,710 A * 10/1941 Stern ...................... A47G 19/34
222/181.2
2,363,155 A 11/1944 Smith
(Continued)

FOREIGN PATENT DOCUMENTS

| EP | 0509881 | 10/1992 |
| FR | 1482209 | 5/1967 |
| JP | 0925724 | 1/1997 |

OTHER PUBLICATIONS

Jarret Diggins, International Search Report for PCT/CA2012/000683, dated Aug. 17, 2012, CIPO, Canada.

*Primary Examiner* — Frederick C Nicolas
(74) *Attorney, Agent, or Firm* — Trego, Hines & Ladenheim, PLLC; Brandon Trego; Jonathan Hines (57) ABSTRACT

A transportable container apparatus includes an elongate container having a central axis and a base attached to a bottom end of the container. The container and base are substantially symmetrical about the central axis and the container is oriented substantially vertically with the base resting on a ground surface when in a working position. The container having an upper container section with upper walls substantially parallel to the central axis and a lower container section with lower walls substantially parallel to the central axis. The upper container section includes a sloping hopper at a bottom thereof to direct granular material into the lower container section. A floor of the container is sloped toward an outlet port defined in a ported wall of the lower container section such that granular material stored in the container slides down the floor to the outlet port.

8 Claims, 10 Drawing Sheets

(51) Int. Cl.
  *B60P 1/04* (2006.01)
  *B65D 88/30* (2006.01)
  *B65D 88/32* (2006.01)
  *B65D 90/58* (2006.01)
  *B65D 90/66* (2006.01)
  *B60P 3/40* (2006.01)
  *G01F 11/26* (2006.01)
  *B65D 25/42* (2006.01)
  *G01G 13/06* (2006.01)
  *G01G 13/18* (2006.01)

(52) U.S. Cl.
  CPC ............ *B65D 88/54* (2013.01); *B65D 90/582* (2013.01); *B65D 90/66* (2013.01); *B65D 25/42* (2013.01); *B65D 2590/664* (2013.01); *G01F 11/261* (2013.01); *G01F 11/263* (2013.01); *G01G 13/06* (2013.01); *G01G 13/18* (2013.01)

(58) Field of Classification Search
  CPC ........ B65D 25/42; B65D 88/28; B65D 88/30; B65D 88/546; B65D 90/54; B65D 88/32; B65D 88/54; B65D 90/582; B65D 90/66; B65D 2590/664; B60P 1/6427; B60P 1/04; B60P 3/40
  See application file for complete search history.

(56) References Cited

U.S. PATENT DOCUMENTS

| | | | | |
|---|---|---|---|---|
| 2,920,796 | A | * | 1/1960 | Field .................... A47G 19/34 222/185.1 |
| 3,223,290 | A | * | 12/1965 | Schuld ................ A01K 5/0225 222/185.1 |
| 3,703,247 | A | | 11/1972 | Kostur |
| 3,994,404 | A | | 11/1976 | Kisovec |
| 4,071,166 | A | | 1/1978 | Legille et al. |
| 4,363,428 | A | * | 12/1982 | Kruger ................... B65D 88/68 222/227 |
| 4,855,960 | A | | 8/1989 | Janssen et al. |
| 4,958,741 | A | | 9/1990 | Johanson |
| 6,121,556 | A | | 9/2000 | Cole |
| 6,571,990 | B2 | * | 6/2003 | Bird .................... B65D 88/66 222/185.1 |
| 7,214,028 | B2 | | 5/2007 | Boasso et al. |
| 7,762,281 | B2 | | 7/2010 | Schuld |
| 9,315,294 | B2 | * | 4/2016 | Herman ................ B65D 25/42 |
| 2002/0034120 | A1 | | 3/2002 | Guntert, Jr. et al. |
| 2007/0181604 | A1 | * | 8/2007 | Rusch ................... G01F 15/001 222/306 |

* cited by examiner

FIG. 18

VERTICALLY ORIENTED TRANSPORTABLE CONTAINER WITH IMPROVED STABILITY

BACKGROUND

This invention is in the field of transportable containers such as bins, tanks, or the like, and in particular such containers that are vertically oriented when installed at a work site and where stability is improved.

In many industries it is required to set up an array of equipment at a temporary work site, and then disassemble the installation, move it to another work site, and re-assemble it. For example asphalt and concrete plants are often set up in locations where large quantities of material are required for mad or building construction. Similarly well drilling rigs, such as those drilling for oil and gas, are set up at a drilling location, then taken down and moved to a different drilling location.

These portable plants and rigs typically include various tanks, bins, silos, and like containers for water, asphalt, sand, cement, and other materials such as might be required at any particular work site. These are transported to the work site, commonly in a lowered horizontal transport orientation, and then raised to a vertical working orientation at the work site. These containers are typically transported to the work site by flat-bed trucks or trailers in a lowered horizontal transport orientation. The trailer is maneuvered into position, and then the container is raised from the horizontal transport position to a vertical working position resting on the ground, and the trailer is moved away from the site.

This vertical orientation reduces the ground area, or footprint, occupied by the installation. Also bins containing dry granular material especially are often elongated vertically when in a working position to maximize the quantity of material stored above a hoppered bottom such that the granular material will flow out by gravity. Containers holding granular material typically have a hoppered bottom with walls sloping toward an outlet port at the bottom of one side of the container so that all the material inside will flow out through the outlet port, leaving the container empty.

The outlet port is in a fixed location on one side of the bottom of the container, and so during setup at a work site the container must be oriented properly so the outlet port is in a location where the material can be received from the outlet port and used in whatever operation is occurring. Commonly the container includes a chute under the outlet port to direct granular material flowing from the port onto a conveyor belt or the like.

As granular material flows out of the outlet port, the material above the port inside the container flows out first and the level of granular material inside the container on the port side thereof above the fixed outlet port falls until the angle of repose of the particular material is reached, and material from the opposite side of the container begins to flow. Thus the loaded container is unbalanced, with more weight on the side opposite the port, making the container less stable, as the wind force necessary to be exerted on the port side of the container to tip the container over is reduced.

Such containers are also known that have a center outlet port in the bottom, however a conveyor or the like is then required to receive the material and carry it to a location outside the container. Alternatively the container can be mounted on legs and a chute can receive the material and direct it to a location beside the container, however this makes containers of the same capacity considerably higher and less stable.

Stability is also reduced when the container is empty. When filled, the weight of the contents keeps the container in place but when empty, winds or accidental contact with other equipment being moved at the work site can more easily cause the container to tip over. The stability of such containers is commonly calculated as an empty wind load rating based on the wind velocity necessary to tip the container over when empty.

SUMMARY OF THE INVENTION

It is an object of the present invention to provide a transportable container apparatus that overcomes problems in the prior art.

In a first embodiment the present invention provides a transportable container apparatus comprising an elongate container having a central axis, and a base attached to a bottom end of the container. The container and base are substantially symmetrical about the central axis, and the container is oriented substantially vertically with the base resting on a ground surface when in a working position. The container comprises an upper container section and a lower container section, where the upper container section has an upper cross-sectional area that is greater than a lower cross-sectional area of the lower container section, and the upper container section includes a sloping hopper at a bottom thereof, the hopper configured to direct granular material into the lower container section. An outlet port is defined in a ported wall of the lower container section, and a floor of the container is sloped toward the outlet port such that granular material stored in the container slides down the floor to the outlet port.

In a second embodiment the present invention provides a transportable container apparatus comprising an elongate container that is oriented substantially vertically resting on a ground surface when in a working position. An outlet port is defined in a lower portion of a wall of the container, and a floor of the container is sloped toward the outlet port such that granular material stored in the container slides down the floor to the outlet port. A gate is configured to control flow of material through the outlet port, and a chute assembly is configured to receive the granular material from the outlet port when the gate is open and deliver the granular material to a chute outlet. The chute assembly is configured such that the chute outlet can swing through an arc from a farthest right position to a farthest left position.

It is contemplated that the container will typically be cylindrical, thereby avoiding structural issues involved in loading and unloading a container with corners. The more centralized unloading that is provided results in improved stability, and stabilizer legs can further enhance stability. Increased leeway in positioning the container apparatus is provided by allowing the chute assembly to pivot. A transport trailer can load the apparatus in a number of orientations to facilitate positioning the chute outlet at a required location, and can be detached when the apparatus is erected.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
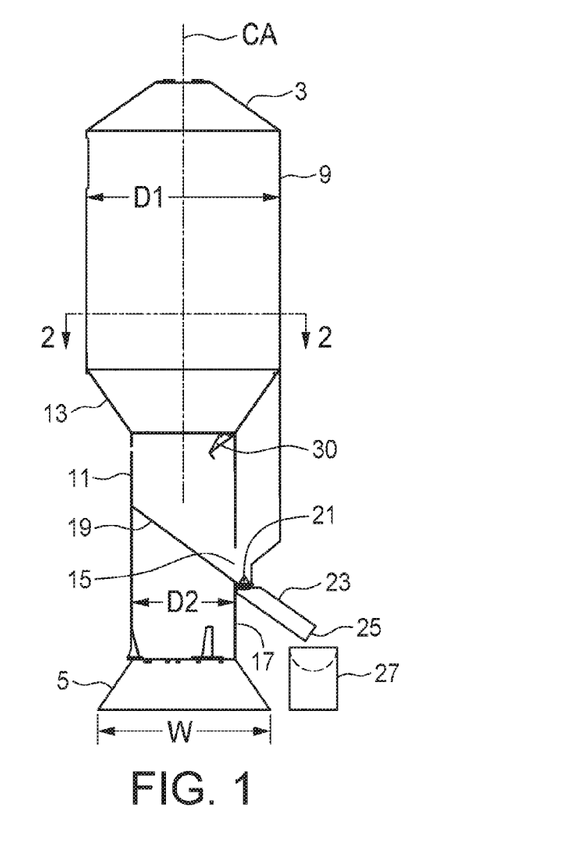
FIG. 1 is a schematic cutaway side view of an embodiment of a transportable container apparatus of the present invention.
Figure 2A:
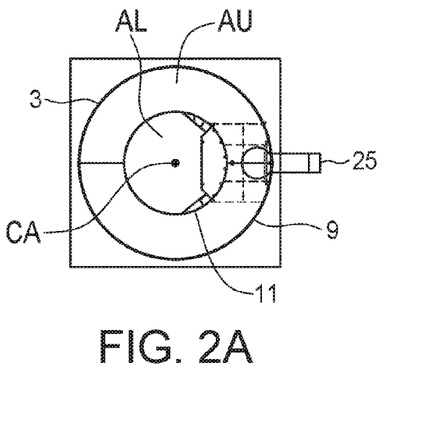
FIG. 2A is a top sectional view along line 2-2 in FIG. 1 showing the cylindrical shape of the container of the apparatus.
Figure 2B:
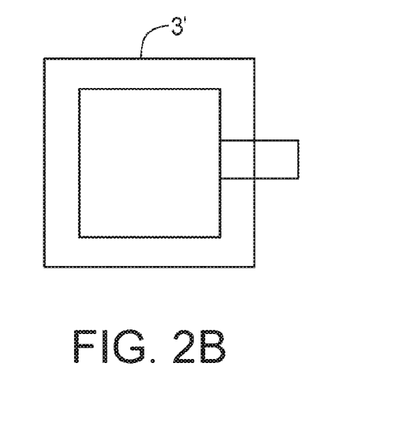
FIG. 2B is a top sectional view of a possible alternate square shape of the container of the apparatus.

FIG. 1 schematically illustrates a cut away side view of an embodiment of a transportable container apparatus 1 of the present invention. The apparatus 1 comprises an elongate container 3 having a central axis CA, and a base 5 attached to a bottom end of the container 3. Load cells may be provided between the container 3 and base 5 to indicate how much material is in the container 3. The illustrated container 3 is cylindrical, as schematically illustrated in the sectional view FIG. 2A of the container 3, but a container for use with the present invention could also he square as schematically illustrated in the sectional view FIG. 2B of a container 3', or another shape such as hexagonal, octagonal, or the like where the container 3 and base 5 are symmetrical about the central axis CA. It is contemplated that a cylindrical shape will best facilitate manufacture of the apparatus 1. however other shapes could also he used.

The container 3 comprises an upper container section 9 and a lower container section 11. The upper container section 9 has an upper cross-sectional area AU that is greater than a lower cross-sectional area AL of the lower container section 11. In a cylindrical container 3 as illustrated, the diameter D1 of the upper container section 9 is greater than the diameter D2 of the lower container section 11. Although proportions may vary, in the illustrated container 3 the upper container section 9 has a diameter D1 that is about twice the diameter D2 of the lower container section 11. The upper container section 9 includes a sloping hoppered transition 13 at a bottom thereof, the hopper 13 configured to direct granular material into the lower container section 11.

The elongate container 3 is oriented substantially vertically with the base 5 resting on a ground surface 7 when in a working position. The base 5 is square and has a width W that is substantially equal to the diameter D1 of the upper container section 9. The apparatus 1 is transported in a horizontal orientation and thus the width of the base 5 and the diameter D1 of the upper container section 9 both define the maximum outside dimension when moving along the road. This dimension is limiting in most applications since it is generally desirable to keep the maximum transport width to a dimension where traffic regulations restrict movement of the apparatus 1. The square shaped base 5 will provide the largest footprint area for the given transport width and thus provide the maximum stability attainable for that dimension.

An outlet port 15 is defined in a ported wall 17 of the lower container section 11. The floor 19 of the container 3 is conical with all sides sloped toward the outlet port 15 such that granular material stored in the container 3 slides down the floor 19 to the outlet port 15. The conical configuration of the floor 19 eliminates corners and also provides a structure that eliminates the need for supports under the floor 19.

A gate 21 can be opened or closed to control flow of granular material out of the container 3 through the outlet port 15, and a chute assembly 23 is configured to receive the granular material from the outlet port 15 when the gate 21 is open and deliver the granular material to a chute outlet 25 located beyond the edge of the base 5 so that a conveyor 27 or the like can he placed on the ground to receive the material and convey same to a desired location.

The chute assembly 23 can be configured by enclosing the top of same such that, when the chute outlet 25 is blocked, granular material. is contained by the chute assembly 23 when the gate 21 is open. Such a configuration allows the gate 21 to be opened wide so that material flows onto the conveyor 27 as fast as the conveyor takes it away, and if the conveyor 27 stops, the material piles up on the conveyor 27 and blocks the chute outlet 25. When the conveyor 27 starts again, flow is resumed. For transport, the chute assembly 23 can he removed, or as described in an alternate embodiment below, pivoted to a stored position inside the footprint defined by the base 5.

Figure 3:
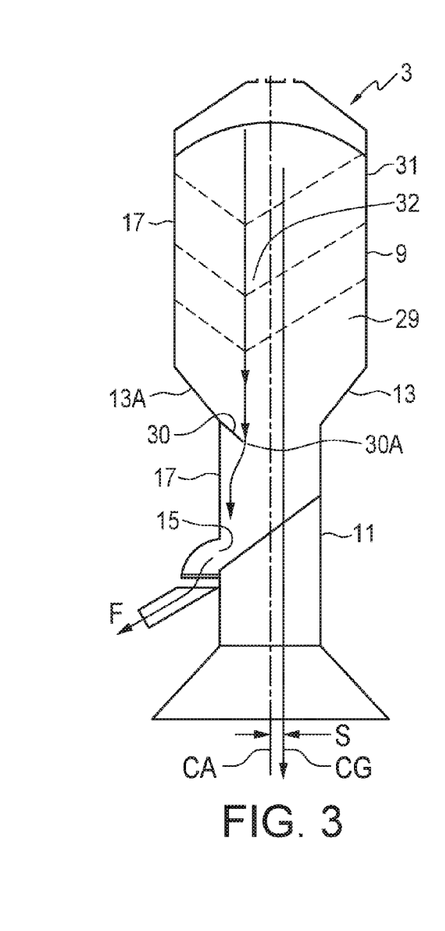
FIG. 3 is a schematic cutaway side view of the embodiment of FIG. 1 illustrating the flow of granular material out through the outlet port.
Figure 4:
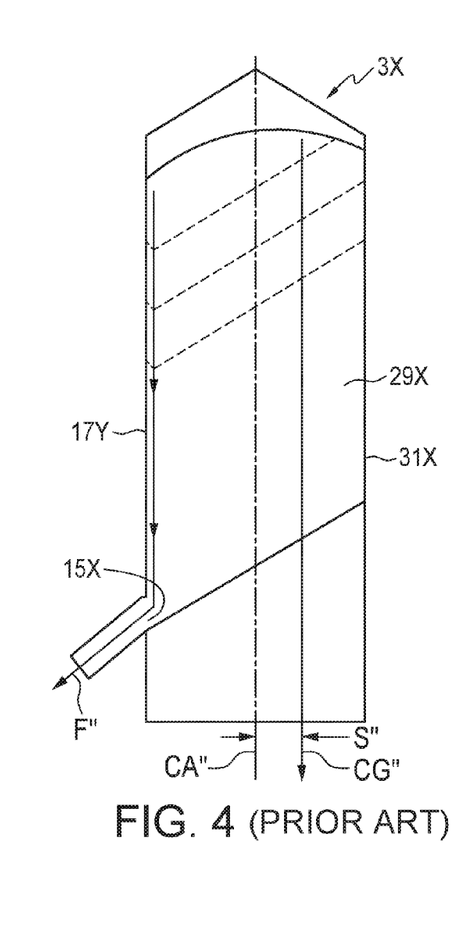
FIG. 4 is a schematic cutaway side view of a transportable container apparatus of the prior art illustrating the flow of granular material out through the outlet port.

FIG. 3 schematically illustrates the flow of granular material 29 out of the container 3 through the outlet port 15. FIG. 4 schematically illustrates with arrows F" the flow of granular material 29X out through the outlet port 1.5X of a prior art container 3X. The level of granular material 29, 29X remaining in the respective containers 3, 3X as the material flows out is indicated by the dotted lines which are oriented at the angle of repose of the granular material.

In the prior art container 3X of FIG. 4, the granular material 29X flows down the ported side 17X of the container 3 and out through the outlet port 15X. As can be seen, a significant proportion of the remaining material in the prior art container 3X is located toward the side 31X of the container 3X that is opposite the ported side 17X of the container 3X. The center of gravity CG' of the container 3X and the granular material remaining in the container 3X as material flows out thus shifts toward the side 31X. This shift is indicated by the space S" between the central axis CA" of the prior art container 3X and the center of gravity CG" thereof.

FIG. 3 schematically illustrates with arrows F the flow of granular material 29 from the container 3 of the present invention. A deflector 30 is added to the bottom of the hopper 13 around the ported side 13A of the hopper 13. As material 29 flows down and out of the upper container portion 9, the material must move down at the inner edge 30A of the deflector 30. The material 29 thus forms a well 32 with the center of the well 32 above the inner edge 30A of the deflector 30. Material flows into the well 32 from the ported side 17 and the side 31 of the upper container portion 9 that is opposite the ported side 17. Thus it can be seen that the center of gravity of the material 29 in the upper container portion 9 is nearer the central axis CA than is the case in the prior art container 3X.

Thus the center of gravity of the of the container 3 and the granular material 29 remaining in the container 3 as material 29 flows out is a reduced spacing S from the central axis CA compared to the spacing S" in the container 3X of the prior art.

Figure 3A:
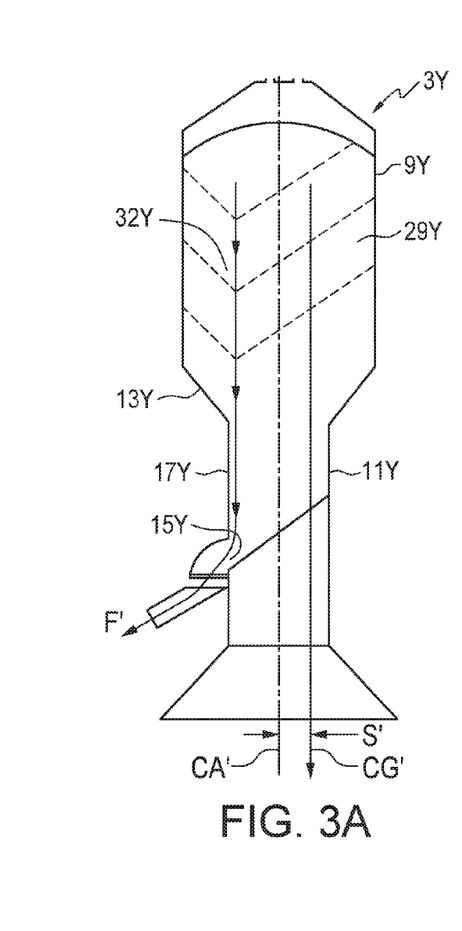
FIG. 3A is a schematic cutaway side view of the embodiment of FIG. 1 illustrating the flow of granular material out through the outlet port when the deflector is removed.

FIG. 3A illustrates the flow of material where there is no deflector. The deflector is added to accentuate the shift of the material 29Y in the upper container portion 9Y toward the central axis CA'. It can be seen in FIG. 3A that if the deflector 30 shown in FIG. 3 is removed, the material 29Y will simply flow from the bottom edge of the hopper 13Y down along the ported wall 17Y of the lower container section 11Y to the outlet port 15Y. The center of the well 32Y would then be above the ported wall 17Y of the lower container portion 11Y. Thus amount of material 29Y in the upper container portion 9Y that is located on the side of the central axis CA' of container 3Y that is opposite the port 15Y is comparatively less than that in the prior art container 3X shown in FIG. 4 and comparatively more than that in the container 3 with the deflector 30 shown in FIG. 3. Thus the spacing of the center of gravity CG' from the central axis CA' in the container 3Y of FIG. 3A is greater than the spacing S in the container 3 of FIG. 3, and less than the spacing S" in the container 3X of FIG. 4.

Thus the container 3Y has improved stability over container 3X because the center of gravity is closer to the central axis, and the container 3 with deflector 30 has further improved stability over container 3Y because the center of gravity is still closer to the central axis.

The more offset the center of gravity CG is from the central axis CA, the less the wind force or accidental contact force required to tip the container over in the offset direction.

It is contemplated that for most applications the diameter D1 of the upper container section 9 will be about 1.5 to about 2.0 times the diameter D2 of the lower container section 11.

Similarly the stability of the apparatus 1 when empty is also increased by configuring the apparatus 1 such that when the container 3 is empty, a greater proportion of the total weight of the apparatus is in the lower part thereof. In the illustrated apparatus 1, about one half of the total weight of the apparatus 1 is located in the bottom one third of the height H of the apparatus 1. The base 5 will typically be heavy containing structural members needed to support the container 3, and the weight of the gate 21 and chute assembly 23 will be located in the bottom third as well. Weight could also be added to the base 5 to bring the total weight of the apparatus 1 up to a maximum legal weight for highway travel.

Figure 5:
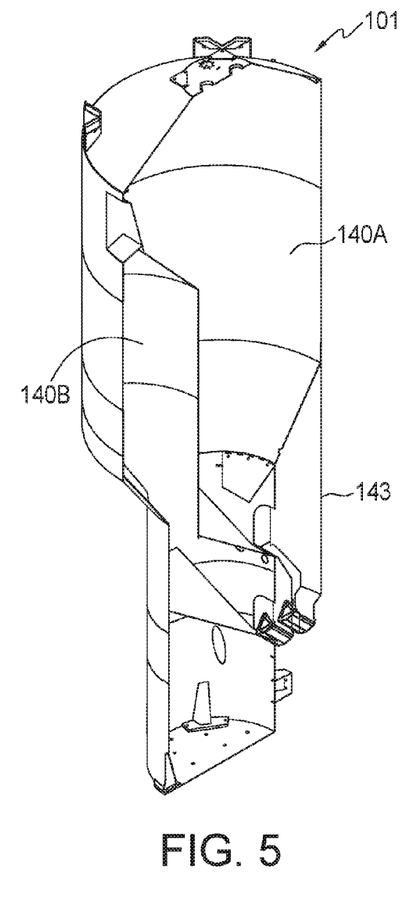
FIG. 5 is a cut away perspective view of an alternate two chamber embodiment of a transportable container apparatus of the present invention with the base removed for easier illustration.
Figure 6:
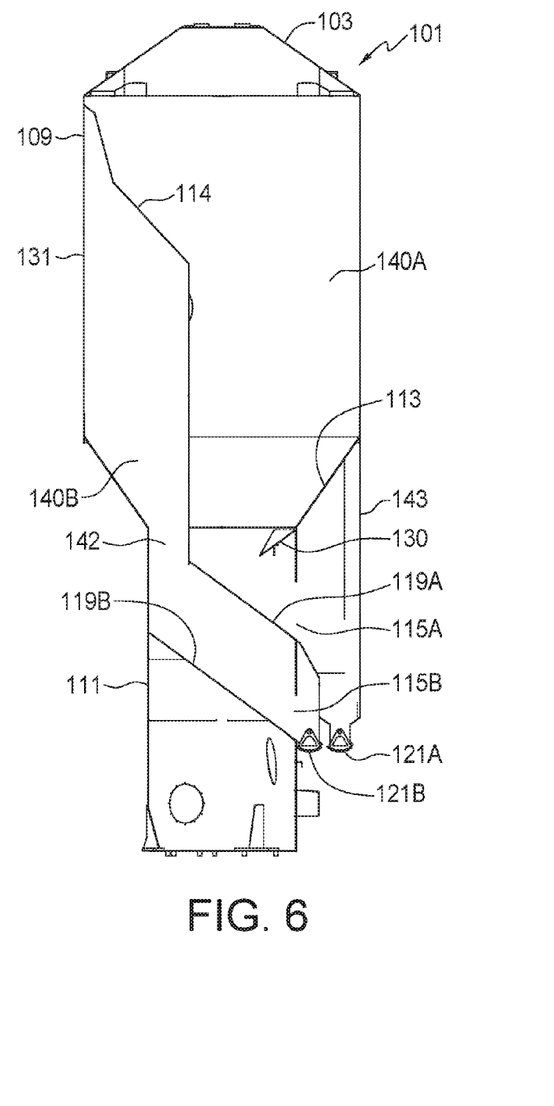
FIG. 6 is a cut away side view of the embodiment of FIG. 5.

FIGS. 5 and 6 illustrate an alternate embodiment of an apparatus 101 of the present invention wherein the container 103 is divided into a first chamber 140A with a first conical floor 119A sloping to a first outlet port 115A, and a second chamber 140B with a second conical floor 119E sloping to a second outlet port 115B. The container 103 is configured to be mounted on a base as in the apparatus 1 described above. The first and second chambers 140A, 140B are divided by a wall 114 extending from the lower container section 111 upward into the upper container section 109 and then sloping laterally to an upright wall 131 of the upper container section 109 that is opposite to the ported wall 117 of the lower container section 111. Alternatively it is contemplated that the dividing wall could go all the way to the top of the container 103 in some applications.

In the illustrated apparatus 101, the first conical floor 119A is above the second conical floor 119B and the first and second floors 119A, 119B slope in the same direction such that the first outlet port 115A is above the second outlet port 115B in the ported wall of the lower container section 111. The floors 119A, 119B are conveniently provided by formed conical sheets welded into the lower container section 111. A deflector 130 is provided at the bottom of the hoppered transition 113 to direct material from the upper container portion 109 toward the center of the apparatus 101. Granular material from the second chamber 140B flows through a portal 142 onto the floor 119B.

Corresponding first and second gates 121A, 121B in this apparatus 101 are provided above the chute assembly rather than directly over the outlet ports 115A, 115B. A housing 143 is mounted to the ported side 117 of the lower container section 111. over the outlet ports 115A, 115B. Granular material from the first chamber 140A flows out the first outlet port 115A to a first clamshell type gate 121A. Granular material from the second chamber 140B flows out the second outlet port 115B to a second clamshell type gate 121B.

Figure 7A:
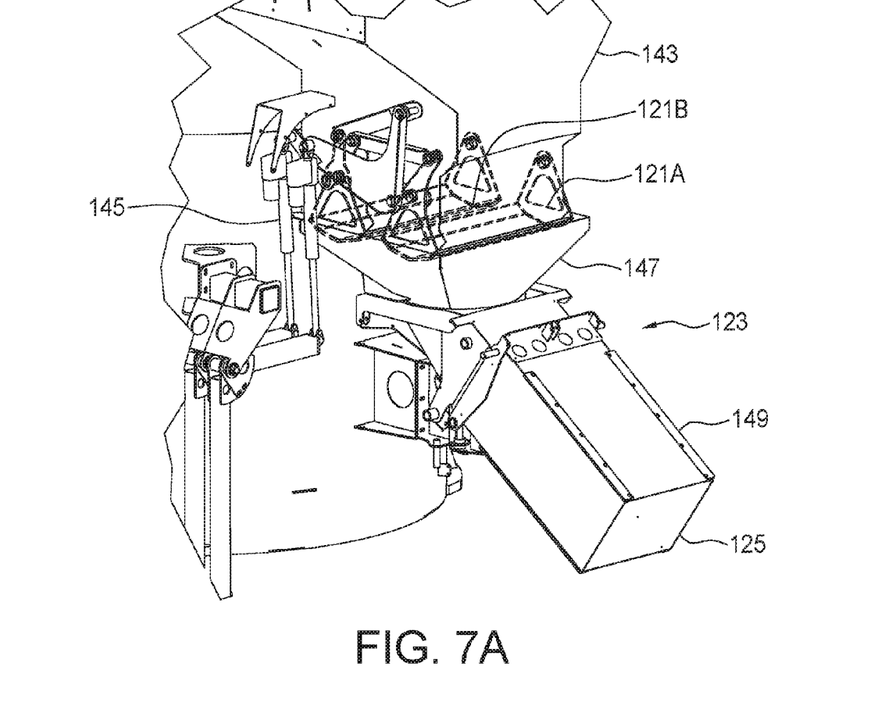
FIG. 7A is a cut away perspective view of the gates and the chute assembly of the embodiment of FIG. 5.
Figure 7B:
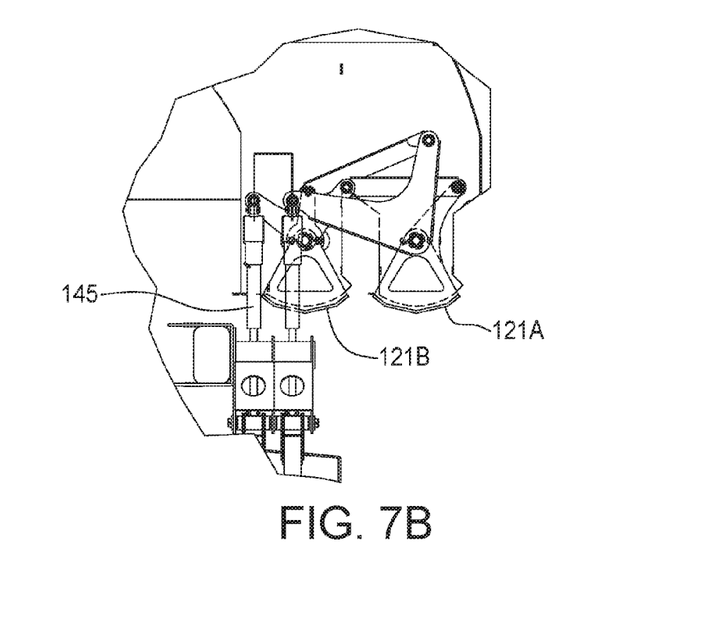
FIG. 7B is a side view of the gates shown in FIG. 7A.
Figure 7C:
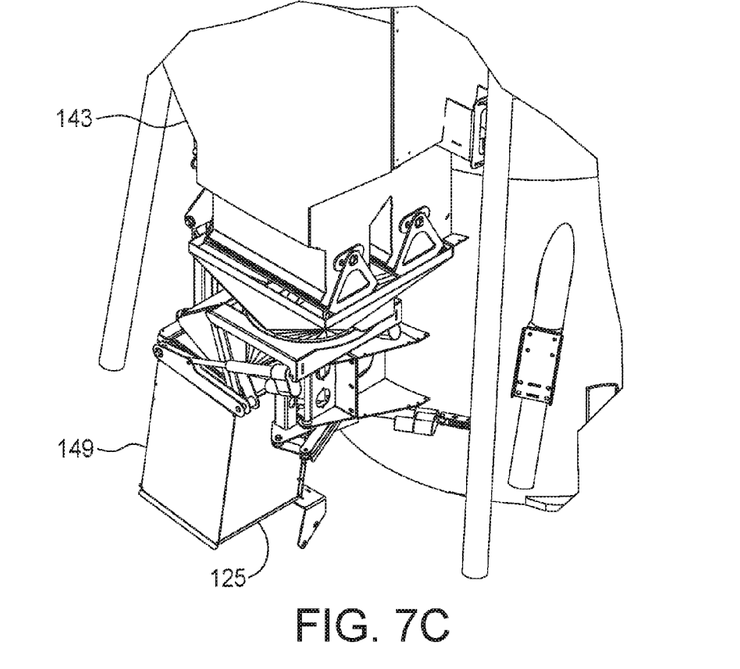
FIG. 7C is perspective view of the chute assembly shown in FIG. 7A in the stored position.
Figure 8:
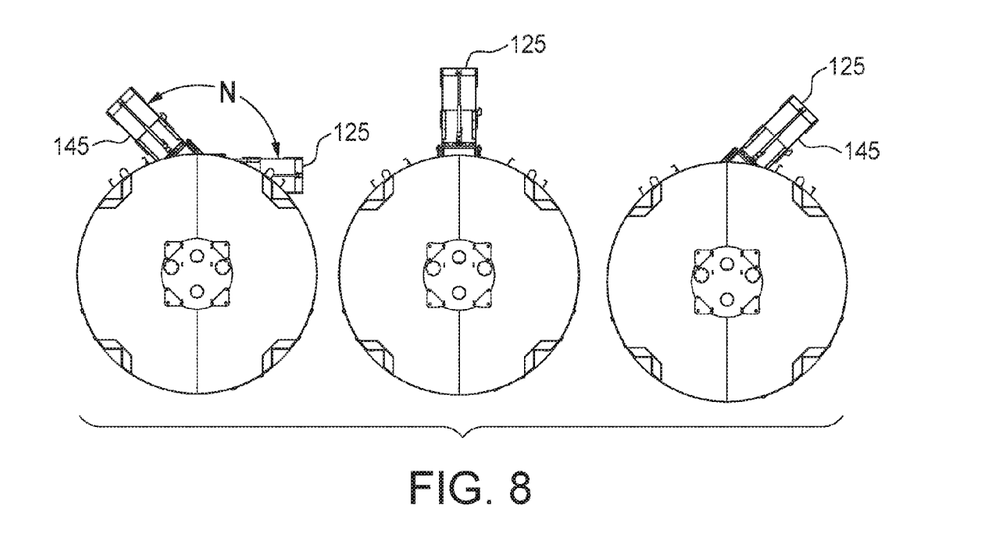
FIG. 8 is a schematic top view showing the pivoting range of the chute assembly of FIG. 5.

The gates 121A, 121B, and chute assembly 123 are illustrated in FIGS. 7A, 7B, 7C. A receiver housing 147 of the chute assembly 123 is mounted to the chute housing 143 under the gates 121A, 121B such that material flowing through either gate is received by the receiver housing 147. A swivel chute 149 of the chute assembly 123 is pivotally connected to the underside of the receiver housing 147 such that the swivel chute 149 and the chute outlet 125 can swing about a vertical pivot axis PA through an arc N from a farthest right position to a farthest left position, as schematically illustrated in FIG. 8. In most applications the arc N will be about 130-160 degrees which will provide considerable leeway in placing the apparatus 101 on the ground and still allow the chute outlet 125 to be located to deliver material to the desired location adjacent to the apparatus 101.

Thus the chute assembly 123 is configured to receive the granular material from the first outlet port 115A when the first gate 121A is open and to receive the granular material from the second outlet port 115B when the second gate 121B is open and to deliver the granular material to a chute outlet 125. The gates 121A, 121B are operated by extendable cylinders 145. As described above for the apparatus 1, the chute assembly 123 is also configured such that, when the chute outlet 125 is blocked, granular material is contained by the chute assembly 123 when one of the gates is open. As illustrated in FIG. 7C, the chute assembly 123 can also be moved to a stored position inside a footprint defined by the base.

Figures 9, 10:
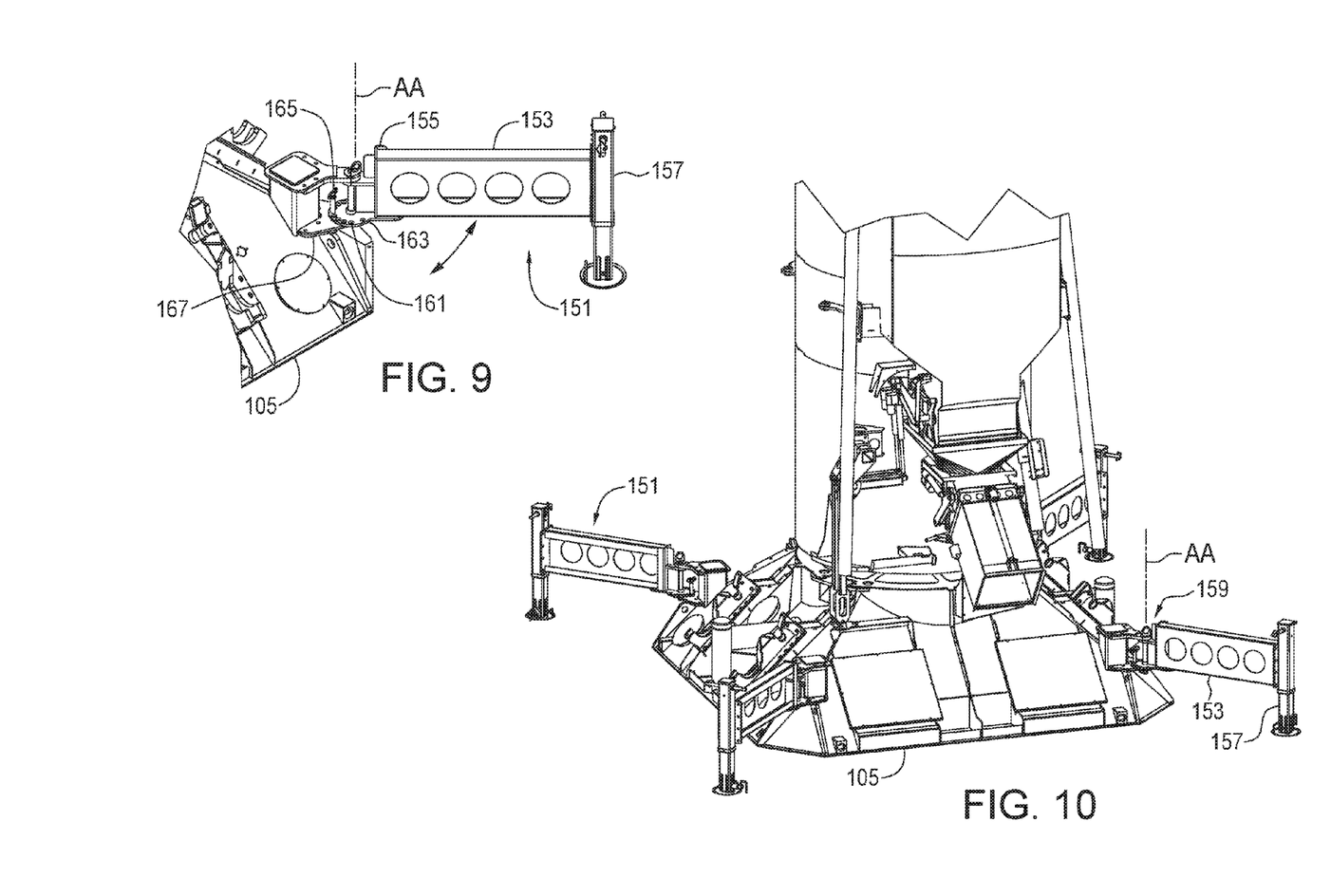
FIG. 9 is a perspective view of a stabilizer leg for use with an apparatus of the present invention.
FIG. 10 is a perspective view of a lower portion of the embodiment of FIG. 5 with the base attached and with legs installed thereon as shown in FIG. 9.

The apparatus 101 also comprises stabilizer legs 151, illustrated in FIGS. 9 and 10. The stabilizer legs 151 comprise a substantially horizontal arm 153 pivotally attached at an inner end 155 thereof to the base 105 about a substantially vertical arm pivot axis AA. A vertical leg jack 157 is attached to an outer end of the arm 153 to move up and down to brace the container apparatus against the ground, and an arm lock 159 is operative to lock the arm 153 at a selected position with respect to the arm pivot axis AA. The stabilizer legs are movable about the arm pivot axis AA from the operating position extending beyond the footprint and contacting the ground, as illustrated in FIGS. 9 and 10, to a stored position inside a footprint defined by the base 105. A stabilizer leg 151 is positioned at each corner of the base 105.

In the illustrated legs 151, the leg jack 157 is a conventional dolly jack such as is used to support the front end of highway trailers and as such is readily available and economical, and has considerable strength, sufficient to resist tipping of the container apparatus 101. The arm lock 159 is provided by a plurality of holes 161 through a lower plate 163 spread around the arm pivot axis AA, and a pin 165 that extends through a hole in the leg bracket 167 and one of the holes 161 when the leg 151 is in a desired position such that pivoting about the arm pivot axis AA is prevented. When the stabilizer legs are extended, the wind load rating of the apparatus 101, and the stability thereof, is substantially increased.

Figures 11, 12, 13:
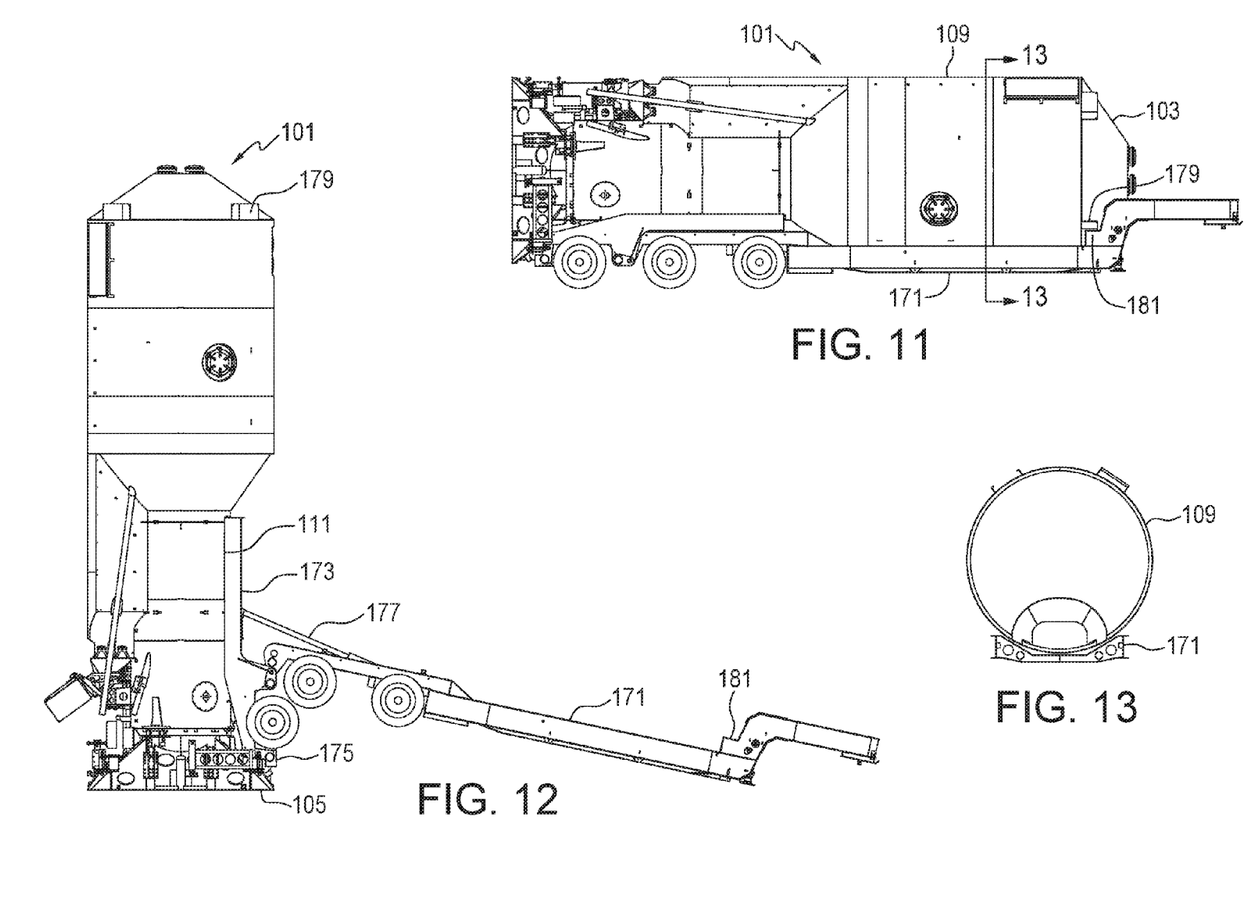
FIG. 11 is a side view showing the embodiment of FIG. 5 in a transport position on a trailer.
FIG. 12 is a side view of the embodiment of FIG. 5 raised to the vertical working position adjacent to the rear end of the trailer.
FIG. 13 is a schematic sectional view along line 13-13 in FIG. 11.

FIGS. 11 and 12 illustrate a trailer 171 releasably attachable to the apparatus 101. A raising bed 173 is pivotally attached at a rear end of the trailer 171 and the bed 173 is attachable to the base 105 and lower container section 111 by pins engaging brackets, or by similar engagement mechanisms 175 mounted on the apparatus 101 and configured to engage the raising bed 173 of the trailer 171. An actuator 177 is mounted to the trailer 171 and is operative, when the raising bed 173 of the trailer 171 is attached to the apparatus 101, to selectively move the apparatus 101 between a transport position as illustrated in FIG. 11 where the apparatus 101 is supported on the trailer 171 in a horizontal orientation, and a working position as illustrated in FIG. 12 where the apparatus 101 is supported on the ground in a vertical orientation.

Support pads 179 are attached to an upper portion of the container 103 and are configured to rest on support posts 181 of the trailer 171 when the apparatus 101 is in the transport position. This arrangement supports the apparatus 101 on the trailer 171 with a wall of the upper container section 109 above the trailer 171 as schematically illustrated in FIG. 13, such that no weight is carried by the wall of the upper container section 109.

Figure 14:
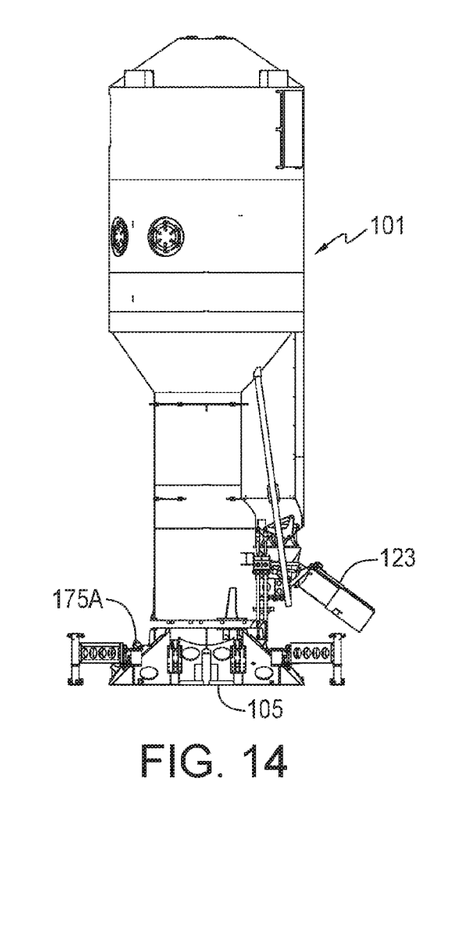
FIG. 14 is a right side view of the embodiment of FIG. 5 with the base attached.
Figure 15:
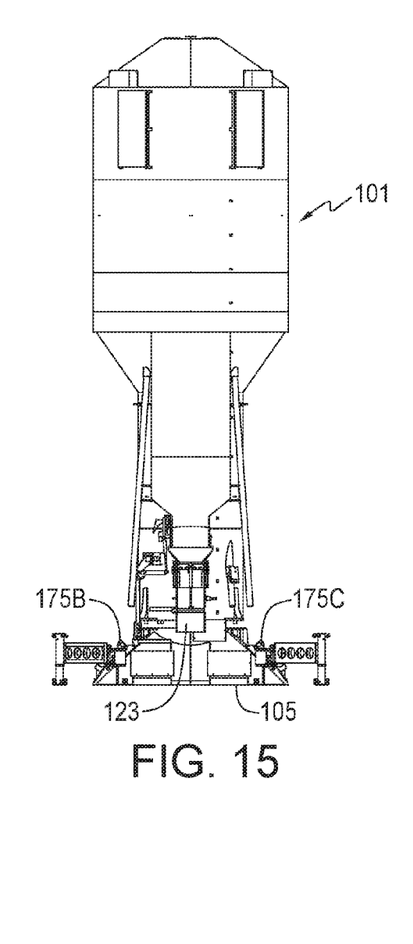
FIG. 15 is a front view of the embodiment of FIG. 5 with the base attached.
Figure 16:
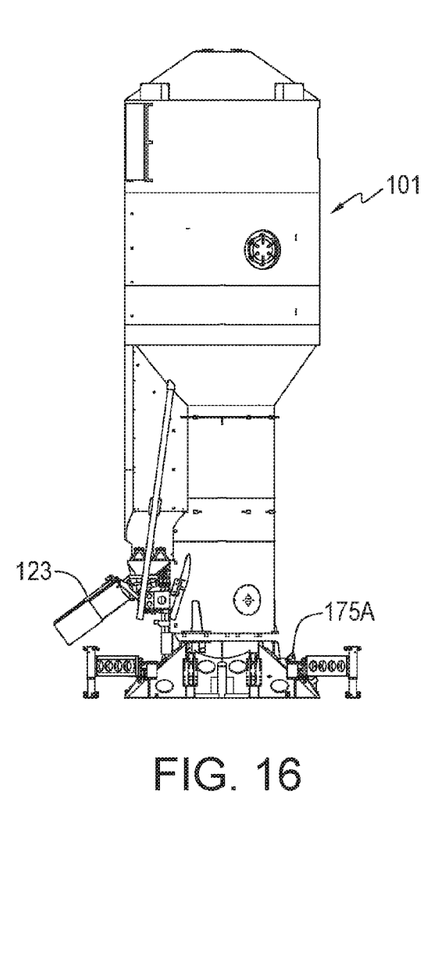
FIG. 16 is a left side view of the embodiment of FIG. 5 with the base attached.

In the illustrated apparatus 101, engagement mechanisms 175 are provided on three sides of the apparatus 101. Engagement mechanism 175A is on the rear side of the base 105, opposite the chute assembly 123 as seen in FIGS. 14 and 16. Engagement mechanisms 175B and 175C are located on the sides of the base 105 that are right and left of the chute assembly 123, as shown in FIG. 15. The trailer 171 is thus releasably attachable to the apparatus 101 at a first, second, and third trailer attachment locations such that when the apparatus 101 is raised to the working position the outlet port and chute assembly 123 will be in one of a corresponding first, second, and third orientation with respect to the trailer 171. The apparatus 101 can thus be loaded on the trailer 171 in a selected one of three orientations.

Figure 17:
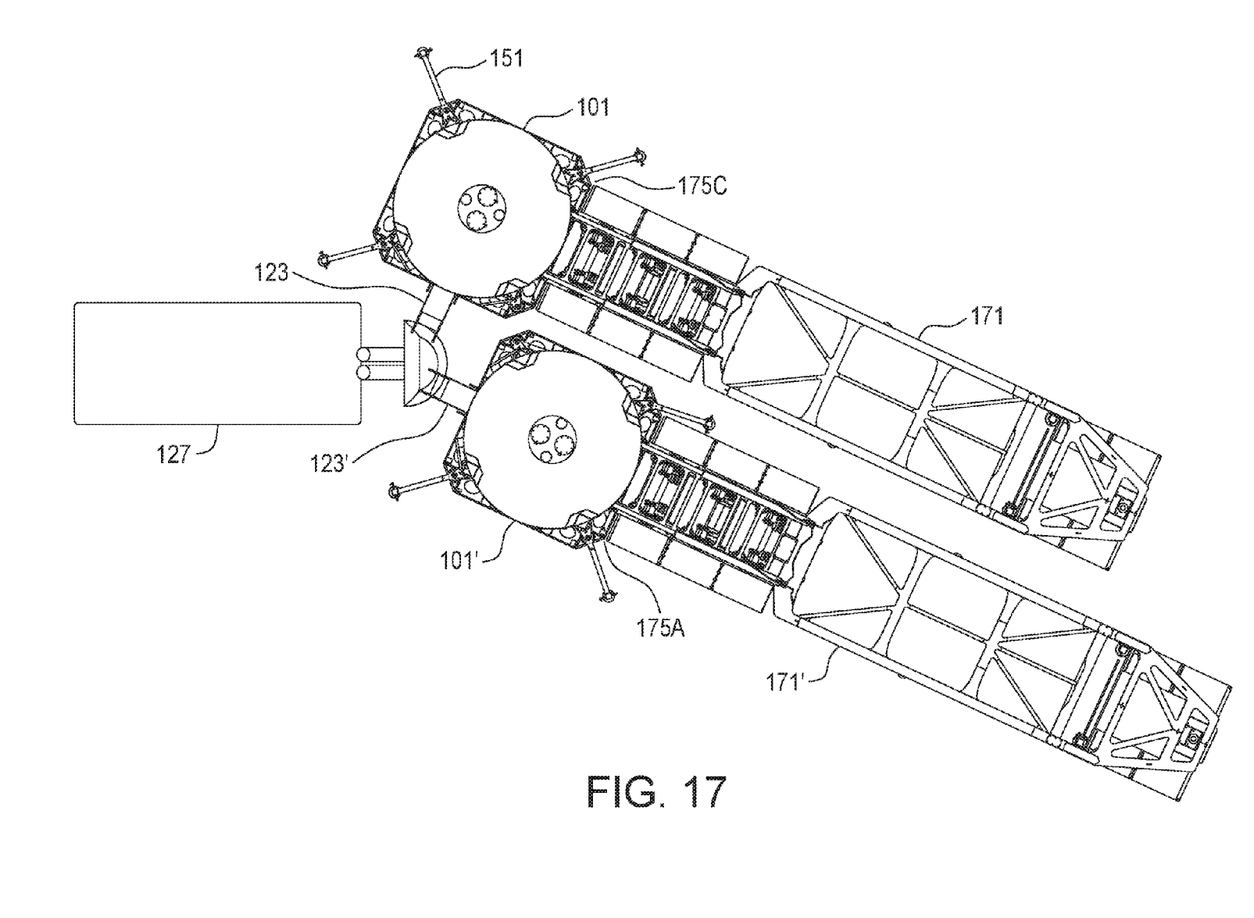
FIG. 17 is top view showing two of the embodiment of FIG. 5 raised to the working position by two trailers at a work site with chute assembly of each container apparatus oriented in a different orientation with respect to the trailer.

FIG. 17 schematically illustrates an example of a pair of the apparatuses 101, 101' of the present invention, each attached to a corresponding trailer 171, 171' in a different orientation and being set up at a work site to deliver material into a conveyor 127. Trailer 171 is attached to engagement mechanism 175C while trailer 171' is attached to engagement mechanism 175A. The apparatuses 101, 101' are located diagonally adjacent to each other, but the plurality of attachment locations and corresponding chute assembly orientations allows the chute assemblies 123, 123' to discharge the container contents into the same conveyor 127 located generally between the apparatuses 101. Typically the trailers 171, 171' will be detached from the apparatuses and moved away from the work site.

FIG. 17 also shows how the stabilizer legs 151 can be moved to a selected location and jacked down to stabilize the apparatus. As can he seen the legs 151 are positioned where there is room, and where there is no room any leg can simply be left in the stored position.

Figure 18:
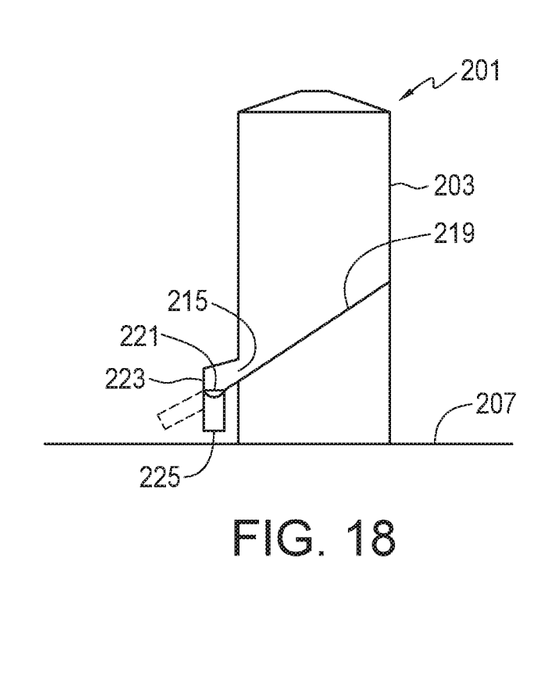
FIG. 18 is a schematic cutaway side view of an alternate embodiment of a transportable container apparatus of the present invention.
Figure 19:
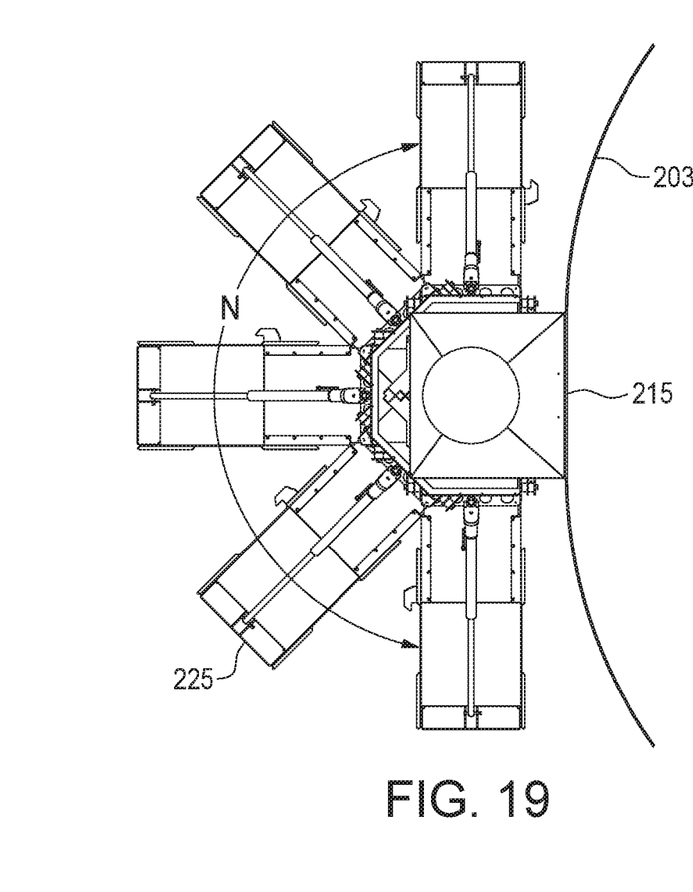
FIG. 19 is a schematic top view showing the pivoting range of the chute assembly of the embodiment of FIG. 18.

FIGS. 18 and 19 schematically illustrate a transportable container apparatus 201 comprising an elongate container 203 that is oriented substantially vertically resting on a ground surface 207 when in a working position. An outlet port 215 is defined in a lower portion of a wall of the container 203 and a conical floor 219 of the container 203 is sloped toward the outlet port 215 such that granular material stored in the container 203 slides down the floor 119 to the outlet port 215.

A gate 221 opens and closes to allow granular material to flow from the container 203 through the outlet port 215. A chute assembly 223 is configured to receive the granular material from the outlet port 215 when the gate 221 is open and deliver the granular material to a chute outlet 225. The chute assembly 223 is configured such that the chute outlet 225 can swing through an arc N from a farthest right position to a farthest left position. In the illustrated chute assembly the angle N is about 180 degrees, and for most applications it is contemplated that an angle N of greater than about 130 degrees will provide satisfactory leeway in positioning the apparatus 201 to deliver granular material therefrom into a desired location.

As described above the chute assembly 223 is enclosed such that, when the chute outlet 225 is blocked, granular material is contained by the chute assembly 223 when the gate 221 is open. Stabilizer legs could also be provided as described above.

The present invention thus provides a transportable container apparatus with more centralized unloading and resulting improved stability. Stabilizer legs can be added to further enhance stability. A pivoting chute assembly can also provide increased leeway in positioning the container apparatus. The apparatus can be configured to attach top a transport trailer in number of different orientations to facilitate positioning the chute outlet at a required location.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. A transportable container apparatus comprising:
   an elongate container having a central axis, and a base attached to a bottom end of the container, wherein the container and base are substantially symmetrical about the central axis, and wherein the container is oriented substantially vertically with the base resting on a ground surface when in a working position;
   the container comprising an upper container section with upper walls substantially parallel to the central axis and a lower container section with lower walls substantially parallel to the central axis, where the upper container section has an upper cross-sectional area that is greater than a lower cross-sectional area of the lower container section, and the upper container section includes a sloping hopper at a bottom thereof, the hopper configured to direct granular material into the lower container section;
   an outlet port defined in a ported wall of the lower container section, the outlet port oriented substantially vertically when the container is in the working position; and
   wherein a floor of the lower container section is sloped toward the outlet port such that the granular material stored in the container slides down the floor to the outlet port.

2. The apparatus of claim 1 wherein the container is substantially cylindrical, and wherein a diameter of the upper container section is greater than a diameter of the lower container section.

3. The apparatus of claim 2 wherein the diameter of the upper container section is about 1.5 to about 2.0 times the diameter of the lower container section.

4. The apparatus of claim 2 wherein the base is substantially square and has a width substantially equal to a diameter of the upper container section.

5. The apparatus of claim 1 wherein the floor is conical.

6. The apparatus of claim 1 wherein the container is divided into a first chamber with a first floor sloping to a first outlet port, and a second chamber with a second floor sloping to a second outlet port.

7. The apparatus of claim 6 wherein the first floor is above the second floor and the first and second floors slope in the same direction such that the first outlet port is above the second outlet port in the ported wall of the lower container section.

8. The apparatus of claim 6 wherein the first and second floors are conical.

* * * * *